J. M. WHITE.
Improvement in Saws for Sawing Fret Holes in Fan Sticks.
No. 119,678.  
Patented Oct. 3, 1871.
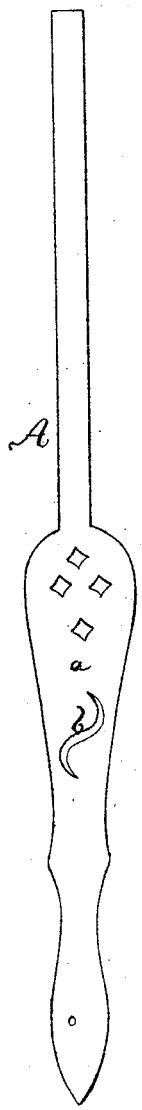
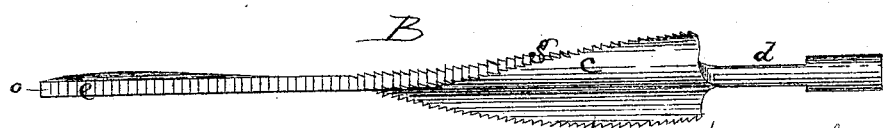

UNITED STATES PATENT OFFICE.

JOSEPH W. WHITE, OF WEYMOUTH, MASSACHUSETTS.

IMPROVEMENT IN SAWS FOR SAWING FRET-HOLES IN FAN-STICKS.

Specification forming part of Letters Patent No. 119,678, dated October 3, 1871.

*To all whom it may concern:*

Be it known that I, JOSEPH W. WHITE, of Weymouth, in the county of Norfolk and State of Massachusetts, have invented an Improvement in Saws for Sawing Fret-Holes in Fan-Sticks, &c.; and I do hereby declare that the following, taken in connection with the drawing which accompanies and forms part of this specification, is a description of my invention sufficient to enable those skilled in the art to practice it.

My invention relates particularly to an improvement in the manner of forming the curvilinear fret-sawed and fancy-shaped holes in fan-sticks. As heretofore produced, such holes have been made by the common jig or fret-saw, the work, supported upon a suitable table, being moved laterally by the workman to cut the desired form, requiring skill and nice manipulation. In my improvement I use a rigid saw, pointed at one end and increasing in width along the blade, with such bend or bends as shall correspond in cross-section to the form of the hole to be cut, so that, as the tool reciprocates and the work is gradually brought under the action of the different parts of the saw, the whole form of the irregularly-shaped hole shall be finally cut, the point of the saw simply making a beginning and the enlargement of the hole only progressing as fast as the saw progressively descends or the work is progressively moved up. My invention consists in a tapering saw, the blade and teeth of which are so made as to form a curved or irregularly-shaped incision as the saw progresses in its action.

The drawing represents a saw embodying my improvement, and a fan-stick having a hole formed by such a saw.

A shows the stick; B, a side view of the tool; C, an end view of the tool. In the stick *a* various and fancifully-formed holes are to be made, the hole or incision *b* being a fair specimen of them. *c* denotes the saw-blade, preferably formed with a shank, *d*, by which to secure the saw in the reciprocating clamp or holder which actuates the saw. The point *o* of this blade is shown as formed with teeth *e* on its opposite edges, a cross-section of the saw near the point being a rectangle. From the point of the blade its width increases, while in thickness the blade remains the same to some distance from the point, and as the blade increases in width its opposite edges are bent so that they gradually conform or approach to the form to be given to the hole, the two wings *g h* of the blade being shown as reversely curved to cut a hole like that shown at *b*, and as the opposite ends or extremities of this hole or incision are to be pointed or angling, the opposite teeth near the large or wide end of the blade are made tapering or decrease in thickness. The stick, supported upon a suitable rest or table, is presented to the action of the point of the saw, (the saw having a short reciprocating movement,) and as the sawing progresses the rest is gradually varied, or the movement of the saw increased, (or the path of reciprocation of the saw gradually made lower,) so that the hole is gradually lengthened until the widest part of the saw cuts the ends and finishes the incision. In this manner the holes can be very quickly and economically formed, without requiring lateral movement of the wood or of the tool.

I claim—

A saw, curved in its transverse section and having both its edges toothed and tapering, substantially as shown and described.

JOSEPH W. WHITE.

Witnesses:
FRANCIS GOULD,
M. W. FROTHINGHAM.

(96)